United States Patent [19]

Aramaki et al.

[11] Patent Number: 4,973,812
[45] Date of Patent: Nov. 27, 1990

[54] WIRE ELECTRODISCHARGE MACHINE

[75] Inventors: Jun Aramaki; Hiroaki Morishita, both of Nagoya, Japan

[73] Assignee: Mitsubishi Denki Kabushiki Kaisha, Tokyo, Japan

[21] Appl. No.: 436,514

[22] Filed: Nov. 14, 1989

[30] Foreign Application Priority Data

Nov. 15, 1988 [JP] Japan ................... 63-286900

[51] Int. Cl.⁵ .................... B23H 1/00; B23H 7/10
[52] U.S. Cl. .................... 219/69.12; 219/69.14
[58] Field of Search ................ 219/69.12, 69.14, 69.11

[56] References Cited

U.S. PATENT DOCUMENTS

| | | | |
|---|---|---|---|
| 4,460,816 | 7/1984 | Bonga | 219/69.12 |
| 4,733,041 | 3/1988 | Obara | 219/69.12 |
| 4,739,144 | 4/1988 | Shibata et al. | 219/69.12 |
| 4,808,787 | 2/1989 | Futamura | 219/69.12 |

FOREIGN PATENT DOCUMENTS

| | | | |
|---|---|---|---|
| 3524377 | 1/1987 | Fed. Rep. of Germany | 219/69.12 |
| 297019 | 12/1986 | Japan . | |
| 62-84923 | 4/1987 | Japan | 219/69.12 |
| 670590 | 6/1989 | Switzerland | 219/69.12 |

*Primary Examiner*—Geoffrey S. Evans
*Attorney, Agent, or Firm*—Sughrue, Mion, Zinn, Macpeak and Seas

[57] ABSTRACT

A wire electrodischarge machine comprises a cross table on which a workpiece is mounted and which is driven in a horizontal plane. In X and Y directions, upper and lower dielectric fluid nozzles which are disposed above and below the workpiece, a nozzle drive device for driving one of the upper and lower nozzles within a horizontal plane, in U and V directions, in order to conduct taper machining, and a verical shaft for supporting the nozzle drive device and the above-mentioned one of the upper and lower nozzles. The axis of the nozzle which is driven by the nozzle drive device is disposed, even during the taper machining, within the area defined by the periphery of the vertical shaft at which the vertical shaft is supported such that it can slide vertically.

6 Claims, 5 Drawing Sheets

WIRE ELECTRODISCHARGE MACHINE

BACKGROUND OF THE INVENTION

The present invention relates to an improvement in a wire electrodischarge machine, particularly as regards the machining accuracy. The present invention is directed to a wire electrodischarge machine comprising upper and lower nozzles disposed above and below a workpiece and guiding an electrode wire, wherein a cross table, on which the workpiece is mounted, is moved in X and Y directions for relative movement of the workpiece and the electrode wire, while one of the upper and lower nozzles is moved in U and V directions in the horizontal plane for inclining the electrode wire relative to the workpiece for the purpose of taper machining.

FIG. 1 is a diagram showing this type of wire electrodischarge machine in the prior art, shown for example in Japanese Patent Application Kokai Publication No. 297019/1986. As illustrated, it comprises a machine main body 1 with a bed 2, a column 3, a cross table 4 driven on the bed 2 in directions of the horizontal plane, a table 5 which is fixed on the cross table 4 and on which a workpiece 6 is fixed, an arm 7 extending from the lower part of the column 3 toward the lower part of the table, a lower nozzle 8 mounted to the tip of the arm 7, a wire guide 9 in the form of a diamond die having a perforation on axis of the lower nozzle 8, an upper nozzle 10 which is disposed opposite to the lower nozzle 8 with respect to the workpiece 6 and supported to the nozzle drive device 12, which is mounted to the tip of the horizontal part 3b of the upper part of the column 3, and a wire guide 11 in the form a diamond die having a perforation on the axis of the upper nozzle 10.

A drive motor 13 is provided to drive the cross table 4 in the X direction. A similar motor, not shown, is provided to drive the cross table 4 in the Y direction. A drive motor 14 is provided for driving the upper nozzle 10 in the U direction, which is one of the directions in the horizontal plane in which the upper nozzle is driven to incline the wire in the workpiece for taper machining. Another drive motor, not shown, is provided for driving the upper nozzle 10 in the V direction, which is the other of the directions in the horizontal plane in which the upper nozzle is driven to incline the wire in the workpiece for taper machining.

An electrode wire 16 is wound on a wire bobbin 15 and unwound from it when the machining is conducted. A brake device 17 is provided for applying necessary tension on the electrode wire 16 to prevent the wire from becoming loose. The electrode wire 16 is passed over pulleys 115 and 118. A wire winding motor 18 is disposed on the downstream end of the electrode wire supply path. A wire collection box 19 recovers the used electrode wire. An NC (numerical control) device 20 is connected to the motors 13 and 14, as well as the motors, not shown, to control the movement of the cross table in the X and Y directions, and the movement of the upper nozzle 10 in the U and V directions.

A dielectric fluid 21 is supplied from a dielectric fluid supply device 22.

As will be seen from the enlarged view of FIG. 2, the nozzle drive device 12 comprises a vertical shaft 23 supported by the column 3 such that it can move up and down and driven by a drive mechanism, not shown, a guide member 24 fixed to the lower end of this vertical shaft 23 and having a dovetail groove 24a on its lower surface, a V slider 25 having, on its upper surface, a dovetail 25a slidably engaging with the dovetail groove 24a of the guide member 24 to be guided in the V direction (the direction normal to the surface of the drawing), and having a dovetail groove 25b formed on its lower surface, and extending perpendicularly to the dovetail 25a, and a U slider 26 which is in the form of a crank extending forward and downward, which has, on the upper surface of its root part, a dovetail 26a slidably engaging with the dovetail groove 25b of the V slider 25 to be guided in the U direction (lateral direction on the drawing), and having the upper nozzle 10 mounted to the lower surface of its tip part. When the motor 14 and another motor, not shown, rotate, the upper nozzle 10 deviates in the U and V directions from the reference position at which taper machining is not conducted.

The operation of the prior-art apparatus having the above configuration will now be described. The electrode wire 16 drawn from the wire bobbin 15 is supplied to the machining section via the brake device 17, and the pulley 115. After passing through the workpiece for electrodischarge machining, the wire is passed over the pulley 118, is wound by the motor 18, and is collected in the wire collection box 19. The wire 16 is supported and positioned by the wire guide 11 of the upper nozzle 10 and the wire guide 9 of the lower nozzle 8. the machining energy is supplied from a machining power supply, not shown, through a feeder, not shown, to the wire, and hence to the space between the wire 16 and the workpiece 6.

During electrodischarge machining, in accordance with the commands given from the NC device 20 to the drive motor 13, and another motor, not shown, the drive motor 13, and another motor, not shown, operate and the cross table 4 moves in the X and Y directions. As a result, the workpiece 6 mounted to the table 5 on the cross table moves relative to the wire 16, and is machined into a desired shape.

When a taper machining is conducted on the workpiece 6, the motor 14 is driven in accordance with the commands from the NC device 20 to move the U slider 26 in the U direction, and/or a motor, not shown, is driven in accordance with the commands from the NC device 20 to move the V slider 25 in the V direction, to incline the wire 16.

During machining, a dielectric fluid 21 is supplied at a high pressure from the dielectric fluid supply device 22 to the machining section via the upper and lower nozzles 10 and 8. The gaps between the upper and lower nozzles and the workpiece 6 are normally controlled to be within 0.01 to 0.02 mm.

In the machining by use of wire in a wire electrodischarge machine, it is necessary to conduct the discharge in a liquid, because the wire breaks if discharge occurs in the air and machining becomes disabled. Accordingly, as the higher machining speed is demanded in recent years, the tendency is to increase the dielectric fluid pressure in order to secure the adequate supply of dielectric fluid to the wire during machining. However, when the liquid pressure of the dielectric fluid 21 supplied to the machining section during machining is increased, the lower nozzle 8 and the upper nozzle 10 are slightly shifted because of the moment load due to the liquid pressure reaction force F. With respect to the lower nozzle 8, the lateral deviation (deviation within the horizontal plane) is small because of the simple cantilever structure by means of the horizontal arm 7, and the problem is not serious. On the other hand, the upper nozzle 10 are supported in a cantilever fashion to the column 3 via the multiple stages of the sliders and the vertical shaft 23, so that the lateral deviation ε is not negligible as indicated by phantom line in FIG. 2. It is considered that this is because the liquid pressure reaction force F functions to push up the upper nozzle 10 at a distance L from the axis of the vertical shaft 23, and a moment load F×L acts on the U slider 26 and the vertical shaft 23, and a bending deformation occurs.

The deviation due to the moment load occurs not only during the taper machining, but also ordinary machining when the upper nozzle is at the reference position and the wire is normal to the XY plane (horizontal plane), and in which the taper machining is not effected. This is because the distance L exists even at the reference position of the upper nozzle 10 although it varies during the driving of the slider mechanism. As a result, the wire guide 11 supporting the wire 16 deviates, and the error in the angle of the wire 16 with respect to the workpiece 6 is increased, and the machining precision is degraded.

SUMMARY OF THE INVENTION

In view of the above, an object of the present invention is to provide a wire electrodischarge machine in which the moment load due to the liquid pressure reaction force, such as the one exerted onto the vertical shaft of the nozzle drive device, is prevented, and the machining precision is improved.

A wire electrodischarge machine according to the invention comprises a cross table on which a workpiece is mounted and which is driven in a horizontal plane, in X and Y directions, upper and lower dielectric fluid nozzles which are disposed above and below the workpiece, a nozzle drive device for driving one of the upper and lower nozzles within a horizontal plane, in U and V directions, in order to conduct taper machining, and a vertical shaft for supporting the nozzle drive device and the above-mentioned one of the upper and lower nozzles. The axis of the nozzle which is driven by the nozzle drive device is disposed, even during the taper machining, within the area defined by the periphery of the vertical shaft at which the vertical shaft is supported such that it can slide vertically.

According to the invention, the axis of the dielectric fluid nozzle which is driven by the nozzle drive device, i.e., the movable nozzle is kept within the area defined by the periphery of the vertical shaft at which the vertical shaft is supported. Accordingly, not only during the ordinary machining when the wire is normal to the XY plane, but also during the taper machining, the liquid pressure reaction force acts as a compressive stress to the vertical shaft and the members supporting the nozzle, so lateral deviation of the wire guide is substantially eliminated, and the machining precision is improved.

BRIEF DESCRIPTION OF THE DRAWINGS

In the accompanying drawings

DETAILED DESCRIPTION OF THE PREFERRED EMBODIMENTS

Figure 3:
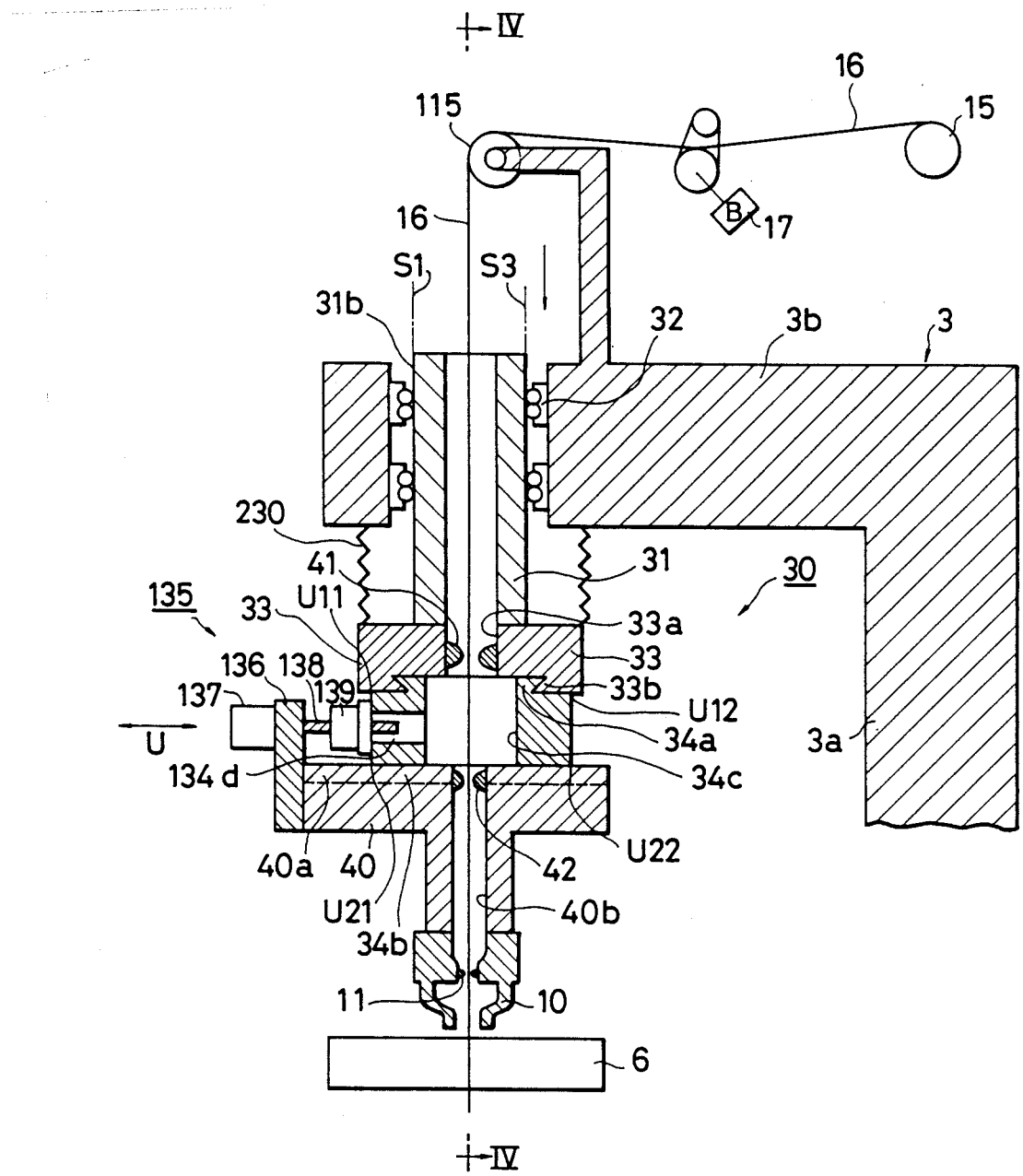
FIG. 3 and FIG. 4 are longitudinal sectional views along line III—III and line IV—IV in FIG. 4 and FIG. 3, respectively, showing an embodiment of the invention.
Figure 4:
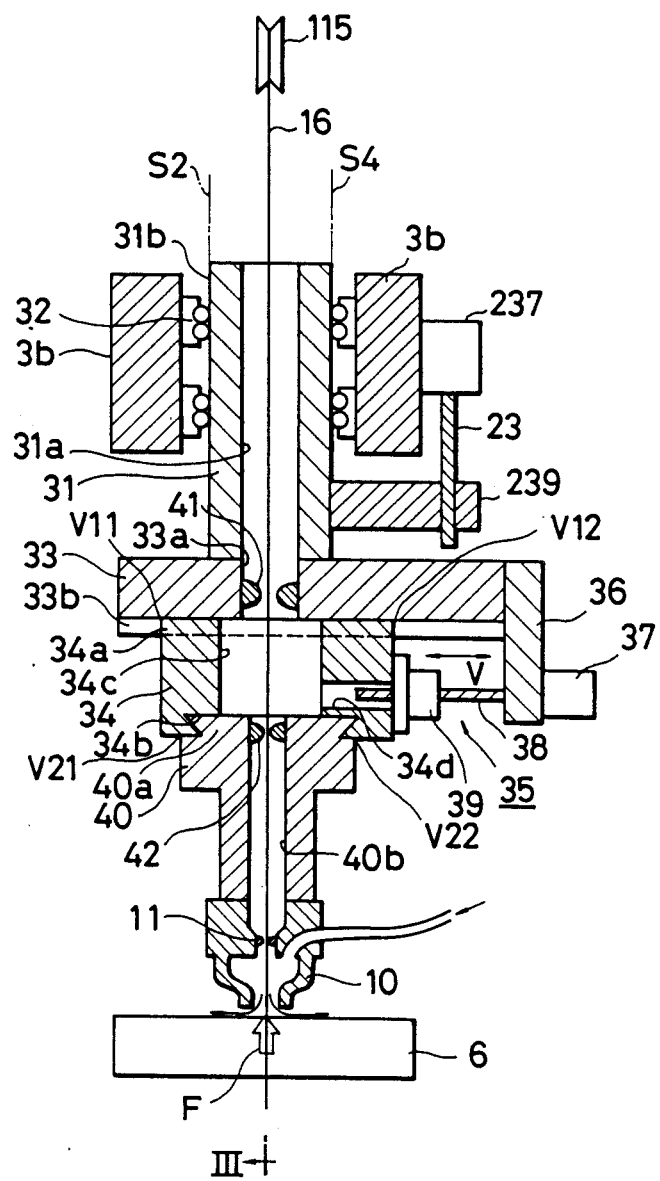

The invention will now be described in connection with the illustrated embodiments. FIG. 3 and FIG. 4 are longitudinal sectional views of part of a wire electrodischarge machine of an embodiment of the invention. Parts identical to those of the prior art are given the same reference marks, and their description is omitted.

Figure 1:
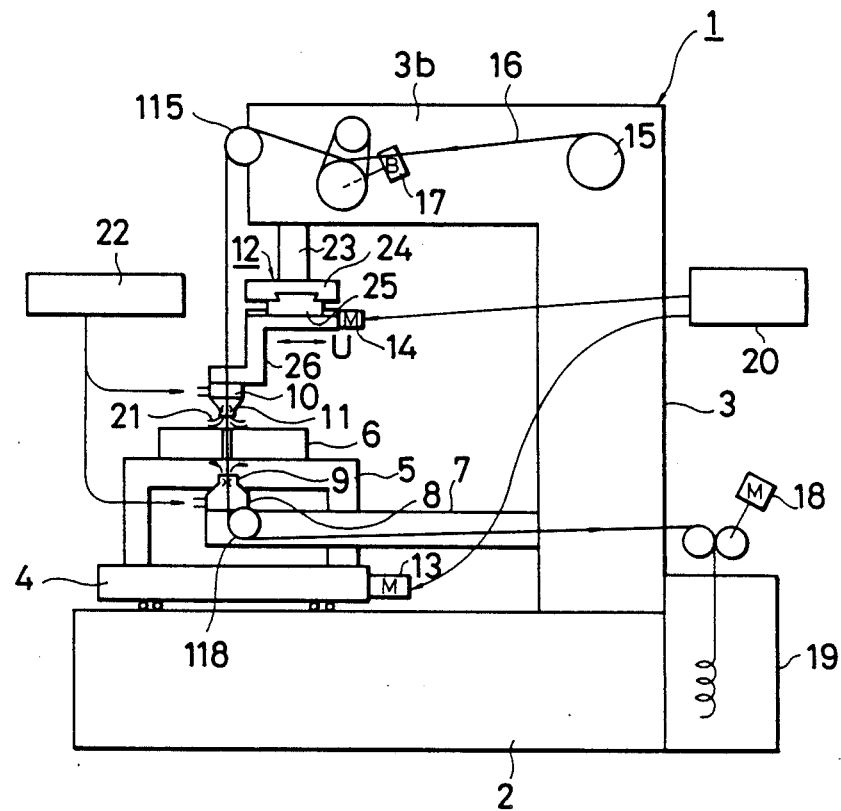
FIG. 1 is an entire view schematically illustrating a prior-art wire electrodischarge machine.
Figure 2:
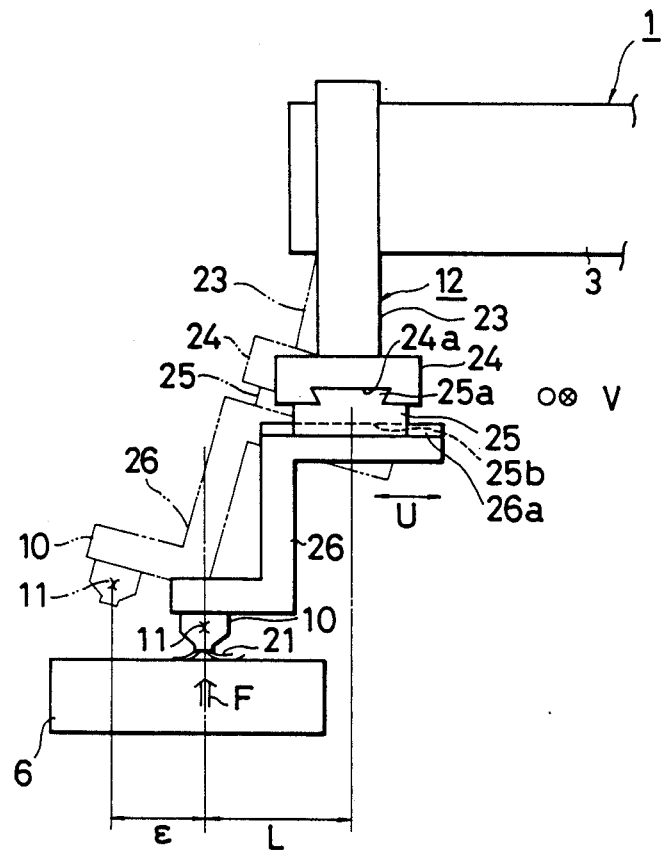
FIG. 2 is a side view showing, in an enlarged scale, part of the machine of FIG. 1.

A column 3, similar to the column 3, in FIG. 1 and FIG. 2, has a vertical part 3a extending vertically, and a horizontal part 3b extending horizontally from the top end of the vertical part 3a.

A vertical shaft 31 is supported by the end of the horizontal part 3b such that it can move up and down, i.e., vertically. For this purpose, guide bearings 32 are provided to slidably engage with the outer periphery 31b of the vertical shaft 31. The vertical shaft 31 is driven by a drive motor 237 whose housing is fixed to the horizontal part 3b of the column 3, a feed screw 238 fixed to the shaft of the motor 237, and a female thread 239 fixed to the vertical shaft 31 and threaded with the feed screw 238.

The vertical shaft 31 has a cylindrical hollow 31a extending vertically along the axis of the vertical shaft 31, and coaxial with the shaft 31. An electrode wire 16 is wound on a wire bobbin 15, and unwound from it when the machining is conducted. A brake device 17 is provided for applying tension on the electrode wire 16 to prevent the wire from becoming loose. Unlike the bobbin 15 and the brake device 17 in FIG. 1 and FIG. 2, which are disposed inside the housing of the column 3, the bobbin 15 and the brake device 17 in this embodiment are disposed outside the column 3. But, the invention covers a situation in which they are inside the column 3, as in the prior art.

The wire 16 is redirected by a pulley 115, and runs through the cylindrical hollow 31a, along the axis of the vertical shaft 31.

Fixed to the lower end of the vertical shaft 31 is a guide member 33 having a cylindrical hollow 33a for passage of the wire 16, and a dovetail groove 33b provided on the lower surface of the guide member 33, and extending in the V direction (the lateral direction as seen in FIG. 4, and the direction normal to the surface of the drawing in FIG. 3). The axis of the hollow 33a is coincident with the axis of the hollow 31a of the vertical shaft 31.

A V slider 34 has, on its upper surface, a dovetail 34a slidably engaging with the dovetail groove 33b, and has, on its lower surface, a dovetail groove 34b extending in the U direction (the lateral direction in FIG. 3, and the direction normal to the surface of the drawing in FIG. 4) perpendicular to the V direction in which the dovetail 34a extends. The V slider 34 is provided with a vertical hollow 34c extending along the axis of the vertical shaft 31. The hollow 34c is also for the passage of the wire 16, and has a larger cross section to allow for the movement of V slider 34 in the V direction and the movement of a U slider 40 (to be described later) in the U direction relative to the wire 16. The relative movement in the V and U directions is made to incline the wire 16 relative to the workpiece for the purpose of taper machining.

The V slider 34 is driven relative to the guide member 33 in the V direction, by a drive mechanism 35, which comprises a motor 37 whose housing is fixed to a bracket 36 which is fixed to and suspended from one side of the guide member 33, a feed screw 38 having its root end coupled to the output shaft of the motor 37 and having its tip extending into a first lateral aperture 34d formed at a first side of the V slider 34, and a female thread member 39 fixed to the outer side surface of the V slider 34 and disposed at the location of the first lateral aperture 34d, and threaded with the feed screw 38.

The U slider 40 has, on its upper end, a dovetail 40a slidably engaging with the dovetail groove 34b of the V slider 34. The V slider 34 is provided with a vertical hollow 40b extending along the axis of the vertical shaft 31. The hollow 40b is for the passage of the wire 16, and has a cross section about the same as the hollow 31a.

The U slider 40 is driven relative to the V slider 34 in the U direction, by a drive mechanism 135, which comprises a motor 137 whose housing is fixed to a bracket 136 which is fixed to and rising from one side of the U slider 40, a feed screw 138 having its root end coupled to the output shaft of the motor 137 and having its tip extending into a second lateral aperture 134d formed at a second side of the V slider 34, a female thread member 139 fixed to the outer side surface of the V slider 34 and disposed at the location of the second lateral aperture 134d, and threaded with the feed screw 138. The hollows 31a, 33a, 34a and 40b are in communication with each other to permit passage of the electrode wire 16.

An upper nozzle 10 is fixed to the lower end of the U slider 40.

The components described above form a drive mechanism 30 for driving the upper nozzle 10. Of the components described, the vertical shaft 31, the motor 237, the feed screw 238, and the female screw 239 form a drive mechanism for driving the upper nozzle 10 vertically, i.e., up and down. The guide member 33, the V slider 34, the U slider 40, the motors 37 and 137, the feed screws 38 and 138, and the female threads 39 and 139 form a drive mechanism which is supported by the vertical shaft 31 and drives the upper nozzle 10 in the V and U directions for the purpose of taper machining.

A wire guide 41 formed of a hard material, typically in the form of a diamond die, and having a perforation for the passage of wire, is disposed at the lower end of the hollow 33a of the guide member 33. Another wire guide 42 also formed of a hard material, typically in the form of a diamond die, and having a perforation for the passage of wire, is disposed at the upper end of the hollow 40b of the U slider 40. These regulate the wire 16 passing through the hollows 31a, 33a and 40b, and prevent it from contacting the inner walls of the hollows 31a, 33a and 40b.

Bellows 230 are provided to prevent entry of dusts.

With the above construction, the vertical shaft 31, the guide member 33, the sliders 34 and 40, and the upper nozzle 10 are kept approximately coaxial with each other. Although they are moved relative to each other during taper machining, the deviation is limited to the range allowed for by the larger diameter hollow 34c. In accordance with the invention, the relative movement is also so regulated, not only during ordinary machining, but also during the taper machining, that the axis of the upper nozzle 10 is kept within the area of projection in the vertical direction of the cross section of the vertical shaft 31, i.e., within the area defined by the outer surface of the shaft 31 engaging with the bearings 32. The limits of such area are indicated by lines S1, S2, S3 and S4 in FIG. 3 and FIG. 4. Moreover, it is preferable that the axis of the upper nozzle 10 be kept within the area limited by the range of engagement between the guide member and the V slider, and by the range of engagement between the V slider and the U slider. That is, the axis of the upper nozzle 10 is within the range of engagement in either or both of the U direction and the V direction. The ends of such ranges of engagement are indicated by V11, V12, V21, V22, U11, U12, U21 and U22 in FIG. 3 and FIG. 4.

Apart from this feature, the operations of the sliders 34 and 40 are identical to those of FIG. 1 and FIG. 2.

Because of the above feature, the liquid pressure reaction force F is received on both sides of the drive mechanism, and not in a cantilever fashion. In other words, the distance L as shown in FIG. 2 is zero, and the moment load $(F \times L)$ is therefore zero, and the liquid pressure reaction force F acts as a compression load onto the sliders 40 and 34, the guide member 33 and the vertical shaft 31, and the lateral deviation $\epsilon$, i.e., the deviation in the direction within the horizontal plane of the upper nozzle 10, or the wire guide 11 is eliminated, and the machining precision is improved.

The liquid pressure reaction force F acting as a compression load is supported by the feed screw 238, via the U slider 40, the V slider 34 and the vertical shaft 31.

Figure 5:
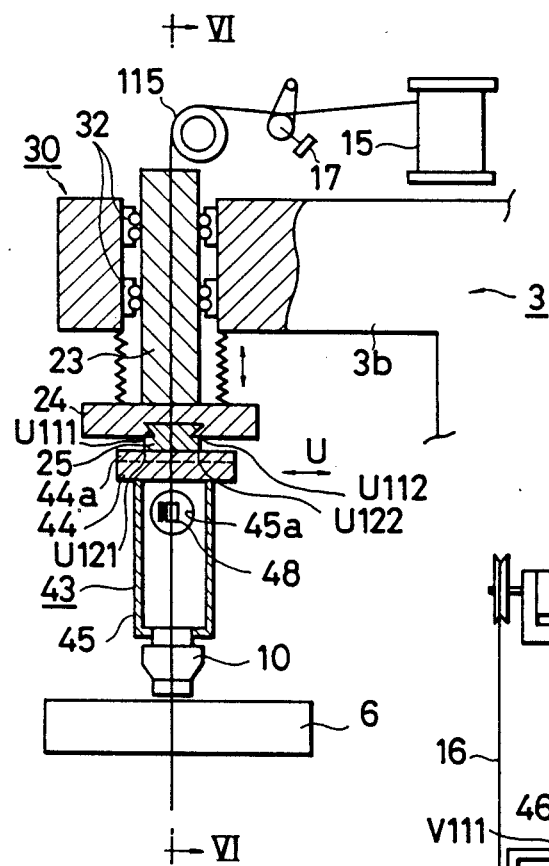
FIG. 5 and FIG. 6 are longitudinal sectional views along line V—V and line VI—VI in FIG. 6 and FIG. 5, respectively, showing another embodiment of the invention.
Figure 6:
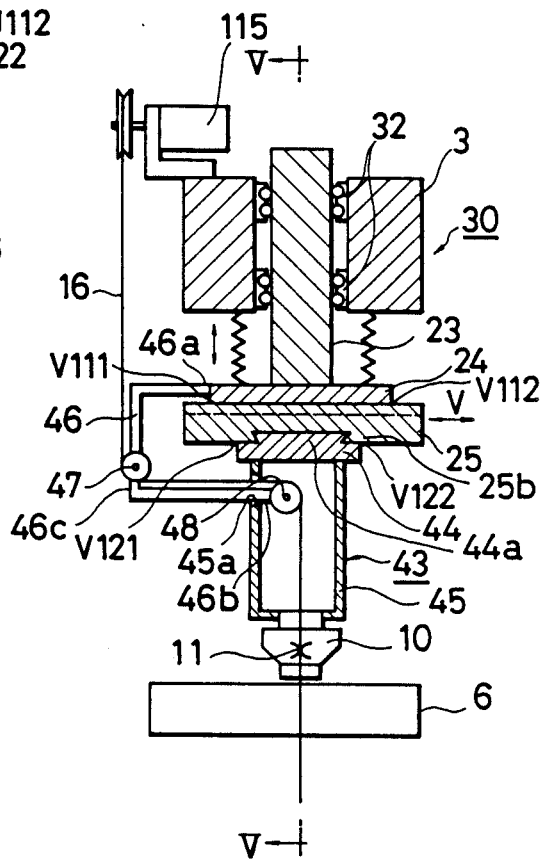

FIG. 5 and FIG. 6 are longitudinal sectional views of the upper nozzle part of a wire electrodischarge machine of another embodiment of the invention. In this embodiment, a vertical shaft 23, a guide member 24, and a V slider 25 are similar to those in the prior art in that they do not have any vertically extending hollows for the passage of wire. A U slider 43 comprises a sliding block 44 having a dovetail 44a engaging with the dovetail groove on the lower surface of the V slider 25. Again, the sliding block 44 does not have any vertically extending hollow. The V slider also comprises a cylindrical part 45 having an upper end fixed to the lower surface of the sliding block 44, and disposed substantially coaxially with the vertical shaft 23. The upper nozzle 10 is fixed to the lower end of the cylindrical part 45.

The cylindrical part 45 is provided with an window 45a in its peripheral wall, at the upper part of the cylindrical part 45. A hook-shaped bracket 46 has a first end 46a fixed to the guide member 24 and has a second end 46b inserted through the window 45a into the space inside the cylindrical part 45. Idle pulleys 47 and 48 are mounted at the lower bend 46c of the hook-shaped bracket 46 and the second end 46b within the cylindrical part 45. By virtue of these idle pulleys 47 and 48, the wire 16 is guided from the outside into the inside of the cylindrical part 45. The wire 16 is then guided by the wire guide 11 in the upper nozzle 10. The rest of the construction is identical to that of FIG. 1, and its description is omitted.

In this embodiment, like the first embodiment described earlier, the relative movement of the vertical shaft 23, the guide member 24, the V slider 25, and the U slider 43 is so controlled that the axis of the upper nozzle 10 is kept within the area of the periphery of the vertical shaft 23 at which the vertical shaft 23 is supported, and within the area limited by the range of engagement between the guide member 24 and the V slider 25, and the range of engagement between the V slider 25 and the U slider 43, as indicated by marks V111, V112, V121, V122, U111, U112, U121 and U122 in FIG. 5 and FIG. 6, not only during the ordinary machining, but also during the taper machining. Accordingly, the liquid pressure reaction force F acts always as a compression load to the sliders 43 and 25, the guide member 24 and the vertical shaft 23, and the lateral deviation of the nozzle 10 is eliminated. The machining precision is therefore improved.

In addition, in the above embodiment, it is not necessary to form the vertically extending hollows for the passage of wire in the vertical shaft 23, the guide member 24, and the V slider 25, so fabrication of the nozzle drive device members is easier, the diameter of the vertical shaft 23 can be reduced, the machine can be made compact, and the initial wire setting is easier.

As has been described, according to the invention, it is so arranged that the axis of the movable dielectric fluid nozzle is within the area defined by the periphery of the vertical shaft at which the vertical shaft is supported, so not only during the ordinary machining, but also during the taper machining, the liquid pressure reaction force acts only as a compression stress to the vertical shaft and other parts of the nozzle drive device, and the lateral deviation of the wire guide is eliminated, and the machining precision is improved.

What is claimed is:

1. A wire electrodischarge machine, comprising:
   a cross table (4) on which a workpiece (6) is mounted and which is driven in a horizontal plane, in X and Y directions;
   an upper fluid nozzle and wire guide (10, 11) disposed above the workpiece;
   a lower fluid nozzle and wire guide (8, 9) disposed below the workpiece, opposite said upper fluid nozzle;
   means (22) for supplying a dielectric fluid (21) under pressure to said upper and lower fluid nozzles, said fluid exiting said nozzles against said workpiece.
   a nozzle drive device for driving said upper fluid nozzle in a horizontal plane, in U and V directions, to conduct taper machining; and
   a vertical, axially slidable shaft (31; 23) for supporting said nozzle drive device and said upper fluid nozzle;
   wherein a central longitudinal axis of the upper fluid nozzle driven by said nozzle drive device is always disposed, even during taper machining, within a horizontal area defined by an axial projection of the cross-section of the vertical shaft such that reaction forces of the dielectric fluid exiting the upper nozzle do not impart any bending moment to the vertical shaft, whereby lateral deviations of the upper nozzle due to such forces are avoided.

2. The machine of claim 1, wherein said nozzle drive device comprises:
   a guide member fixed to the vertical shaft,
   a first slider engaged with said guide member such that it can slide in a first one of the U and V directions; and
   a second slider engaged with said first slider such that it can slide in a second one of the U and V directions;
   said upper fluid nozzle driven by said nozzle drive device being fixed to said second slider;
   wherein said axis of the upper fluid nozzle is disposed, even during taper machining, within an area limited by a range of engagement between said guide member and said first slider and a range of engagement between said first slider and said second slider.

3. The machine of claim 2, wherein said vertical shaft, said guide member, said first slider and said second slider respectively have vertically extending hollows which communicate with each other and which allow passage of the electrode wire.

4. The machine of claim 3, wherein said guide member contains a wire guide disposed at the end adjacent to said first slider, and said second slider contains a wire guide disposed at the end adjacent to said first slider, and the hollow of said first slider has a diameter to allow for movement of the wire relative to said first slider due to the movement of said first slider relative to said guide member in said first one of the U and V directions and due to the movement of said second slider relative to said first slider in said second one of the U and V directions.

5. The machine of claim 2, wherein the engagement between said guide member and said first slider and the engagement between said first slider and said second slider are made by a combination of a dovetail and a dovetail groove.

6. The machine of claim 1, wherein said vertical shaft is slidably supported to a fixed structure by means of bearings.

* * * * *